US012548903B2

(12) United States Patent
Guo et al.

(10) Patent No.: US 12,548,903 B2
(45) Date of Patent: Feb. 10, 2026

(54) ANTENNA ASSEMBLY AND ELECTRONIC DEVICE

(71) Applicant: Lenovo (Beijing) Limited, Beijing (CN)

(72) Inventors: Heng Guo, Beijing (CN); Shumin Liao, Beijing (CN); Hui Lin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 336 days.

(21) Appl. No.: 18/466,496

(22) Filed: Sep. 13, 2023

(65) Prior Publication Data

US 2024/0113417 A1 Apr. 4, 2024

(30) Foreign Application Priority Data

Sep. 30, 2022 (CN) ........................ 202211206847.6

(51) Int. Cl.

| | |
|---|---|
| ***H01Q 5/40*** | (2015.01) |
| ***H01Q 1/24*** | (2006.01) |
| ***H01Q 1/36*** | (2006.01) |
| ***H01Q 1/38*** | (2006.01) |
| ***H01Q 13/20*** | (2006.01) |

(52) U.S. Cl.

CPC ............... *H01Q 5/40* (2015.01); *H01Q 1/244* (2013.01); *H01Q 1/36* (2013.01); *H01Q 1/38* (2013.01); *H01Q 13/206* (2013.01); *H01Q 1/243* (2013.01)

(58) Field of Classification Search

CPC .. H01Q 1/36; H01Q 1/38; H01Q 5/40; H01Q 13/206

See application file for complete search history.

(56) References Cited

U.S. PATENT DOCUMENTS

| | | | | |
|---|---|---|---|---|
| 6,670,922 B1 * | 12/2003 | Huang | H01Q 21/30 343/895 |
| 6,906,678 B2 * | 6/2005 | Chen | H01Q 1/243 343/700 MS |
| 7,248,227 B2 * | 7/2007 | Chen | H01Q 1/38 343/700 MS |

(Continued)

FOREIGN PATENT DOCUMENTS

| | | |
|---|---|---|
| CN | 109728434 A * | 5/2019 |
| CN | 216624563 U * | 5/2022 |
| TW | 202040878 A * | 4/2019 |

*Primary Examiner* — Ab Salam Alkassim, Jr.

(74) *Attorney, Agent, or Firm* — ANOVA LAW GROUP, PLLC

(57) ABSTRACT

An antenna assembly comprising an antenna. The antenna includes: a substrate including a first surface and a second surface arranged opposite to each other; a first radiator disposed at the first surface and including two first radiation elements spaced apart from each other and connected to each other by a connector; and a second radiator disposed at the second surface and including a second radiation element disposed at an area of the second surface corresponding to an area of the first surface between the two first radiation elements. Each of the two first radiation elements and the second radiation element includes a current adjustment structure configured to adjust a current flow direction in the radiation element to which the current adjustment structure belongs.

16 Claims, 10 Drawing Sheets

(56) References Cited

U.S. PATENT DOCUMENTS

| | | | | |
|---|---|---|---|---|
| 7,362,280 | B2 * | 4/2008 | Shtrom | H01Q 9/285<br>343/846 |
| 2008/0074340 | A1 * | 3/2008 | Song | H01Q 9/285<br>343/820 |
| 2009/0128414 | A1 * | 5/2009 | Jeng | H01Q 21/28<br>343/700 MS |
| 2013/0009836 | A1 * | 1/2013 | Islam | H01Q 21/30<br>343/810 |
| 2013/0027268 | A1 * | 1/2013 | Ohno | H01Q 9/285<br>343/818 |
| 2013/0222190 | A1 * | 8/2013 | Hung | H01Q 1/38<br>343/702 |
| 2013/0234896 | A1 * | 9/2013 | Sharawi | H01Q 9/0421<br>343/700 MS |
| 2015/0280324 | A1 * | 10/2015 | Petropoulos | H01Q 1/246<br>343/795 |
| 2018/0233810 | A1 * | 8/2018 | Sun | H01Q 21/30 |

* cited by examiner

ANTENNA ASSEMBLY AND ELECTRONIC DEVICE

CROSS-REFERENCE TO RELATED APPLICATION

This application claims priority to Chinese Patent Application No. 202211206847.6, filed on Sep. 30, 2022, and the entire content of which is incorporated herein by reference.

TECHNICAL FIELD

The present disclosure relates to the technical field of electronic device technology and, more particularly, to an antenna assembly and an electronic device.

BACKGROUND

As science and technology constantly advance, more and more electronic devices with a wireless communication function are widely used in people's daily life and work. Such electronic devices bring substantial convenience to people's daily life and work, and become indispensable and important tools.

An antenna is an important component of an electronic device to support the wireless communication function. As the electronic device integrates more and more functions, an internal space of the electronic device is increasingly tight. A smaller space for accommodating the antenna often degrades performance of the antenna.

SUMMARY

One aspect of the present disclosure provides an antenna assembly. The antenna assembly includes an antenna. The antenna includes: a substrate including a first surface and a second surface arranged opposite to each other; a first radiator disposed at the first surface and including two first radiation elements spaced apart from each other and connected to each other by a connector; and a second radiator disposed at the second surface and including a second radiation element disposed at an area of the second surface corresponding to an area of the first surface between the two first radiation elements. Each of the two first radiation elements and the second radiation element includes a current adjustment structure configured to adjust a current flow direction in the radiation element to which the current adjustment structure belongs.

Another aspect of the present disclosure provides an electronic device. The electronic device includes: a back cover, having an external side configured to be detachably fixed to an antenna assembly including a first antenna; a second antenna disposed inside the back cover; and an antenna chip, configured to be connected to the first antenna or the second antenna. The first antenna includes: a substrate including a first surface and a second surface arranged opposite to each other; a first radiator disposed at the first surface and including two first radiation elements spaced apart from each other and connected to each other by a connector; and a second radiator disposed at the second surface and including a second radiation element disposed at an area of the second surface corresponding to an area of the first surface between the two first radiation elements. Each of the two first radiation elements and the second radiation element includes a current adjustment structure configured to adjust a current flow direction in the radiation element to which the current adjustment structure belongs.

DETAILED DESCRIPTION OF THE EMBODIMENTS

Figure 1:
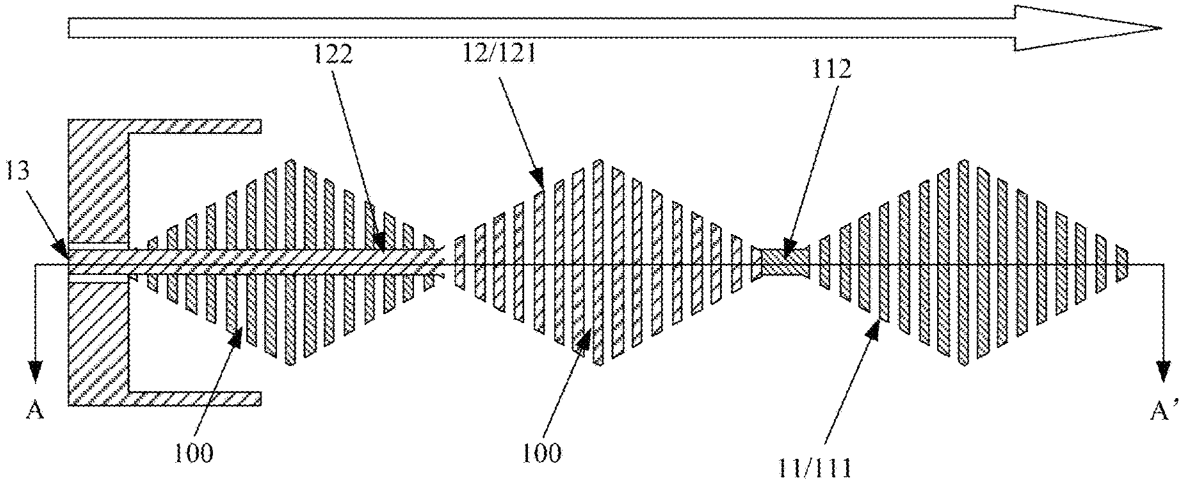
FIG. 1 is a top view of an antenna in an exemplary antenna assembly according to some embodiments of the present disclosure.

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

Currently, in the design of an omnidirectional antenna (also referred to as AP antenna), constraints such as omnidirectionality, high gain, and miniaturization of the antenna are considered. A gain of the omnidirectional antenna is generally lower than that of a directional antenna. The gain of a single omnidirectional antenna, such as, a typical half-wave monopole antenna, is generally only 2 dBi. On the other hand, a dipole antenna is often fed with a signal at a mid-position thereof instead of at a bottom thereof. It is more difficult to design a connection structure between the antenna and a signal feeding terminal or a terminal product in practical applications.

A high-gain antenna may be formed by a multi-radiating-element array. However, this type of antenna may have an excessive size or a complex signal feeding structure. Due to structural space constraints, the terminal product often adopts an electrically small antenna transformed from a monopole antenna, such as an inverted L-shaped antenna, an inverted F-shaped antenna, and a loop antenna. However, these antennas have poor omnidirectionality, substantially low gains in certain directions, and less desired polarization direction of the antenna pattern, thereby affecting user's experience in using communication network function of the electronic device, especially in some extreme scenarios, such as long-distance or partitioned networking. Thus, the omnidirectional antenna generally requires vertical polarization, the omnidirectionality of the omnidirectional antenna is more desired, and the gain is higher.

The present disclosure provides an antenna assembly, in which a new type of antenna is provided. The antenna may be a high-gain Wifi antenna. When the antenna includes a connecting part arranged perpendicular to a horizontal plane, the antenna can have desired horizontal omnidirectionality, and at the same time can have desired vertical polarization of the antenna pattern.

Moreover, the signal feeding terminal of the antenna may be arranged at an edge of an antenna radiator and not between two antenna radiators, thereby facilitating the connection between the antenna and the terminal product in practical applications.

To make the above objectives, features, and advantages of the present disclosure more obvious and comprehensible, the present disclosure will be further described in detail below in conjunction with the accompanying drawings and various embodiments.

Figure 2:
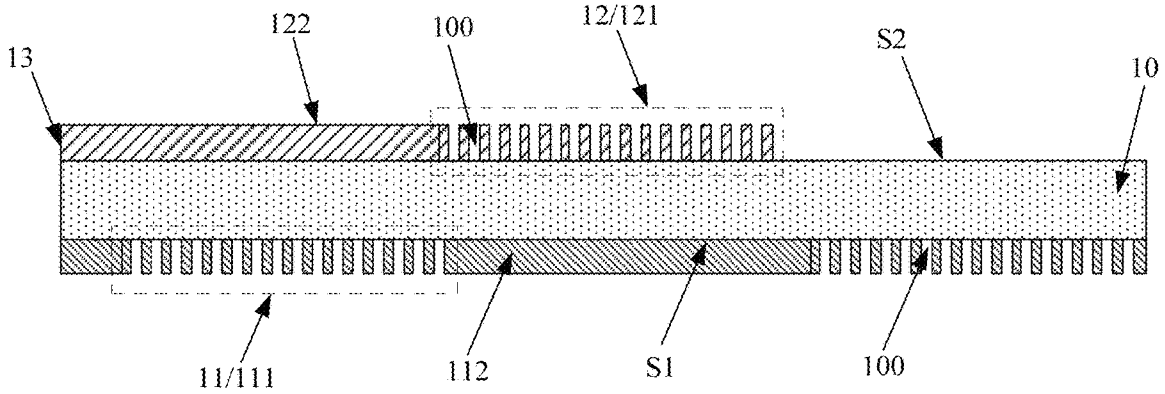
FIG. 2 is a cross-sectional view of the antenna along an A-A' direction shown in FIG. 1.
Figure 3:
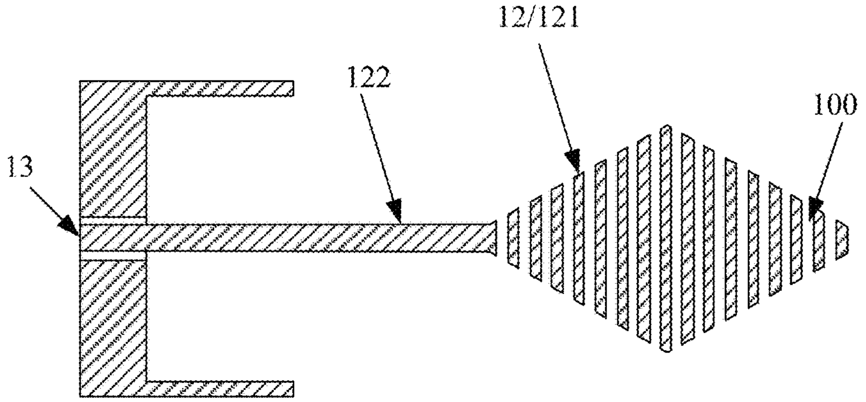
FIG. 3 is a top view of an antenna radiator of the antenna shown in FIG. 1.
Figure 4:
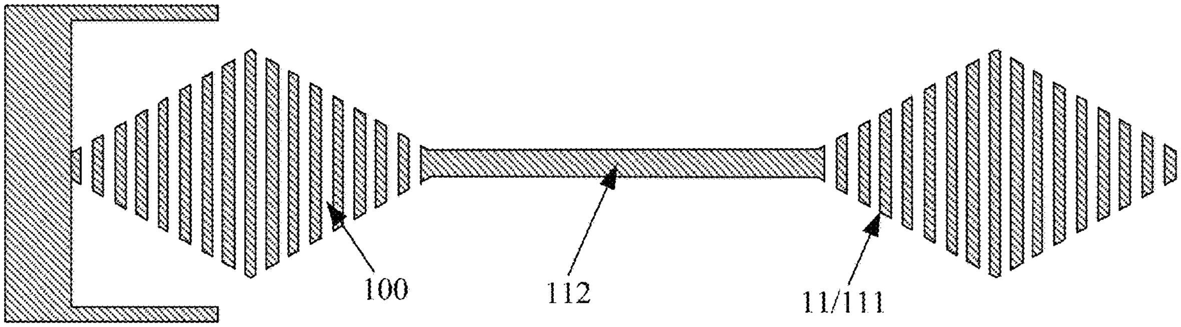
FIG. 4 is a top view of another antenna radiator of the antenna shown in FIG. 1.

FIG. 1 is a top view of an antenna in an exemplary antenna assembly according to some embodiments of the present disclosure. FIG. 2 is a cross-sectional view of the antenna along an A-A' direction shown in FIG. 1. FIG. 3 is a top view of an antenna radiator of the antenna shown in FIG. 1. FIG. 4 is a top view of another antenna radiator of the antenna shown in FIG. 1

The antenna assembly includes the antenna shown in FIGS. 1-4. The antenna includes a substrate 10 having a first surface S1 and a second surface S2 facing toward each other. A first radiator 11 is disposed at the first surface S1, and a second radiator 12 is disposed at the second surface S2. The first radiator 11 includes at least two first radiation elements 111 that are separated by a distance and are connected through a first connector 112. The second radiator 12 includes at least one second radiation element 121 that is disposed at an area of the second surface S1 corresponding to an area of the first surface S1 between two adjacent first radiation elements 111. The at least two first radiation elements 111 and the at least one second radiation element 121 each have a predetermined structure 100. The predetermined structure 100 is capable of adjusting a current flow direction in a corresponding radiation element, and is also referred to as a "current adjustment structure."

In some embodiments, current flows in various radiation elements are maintained in a same direction through the coupling effect between the first radiator 11 and the second radiator 12 and the adjustment of the current flow direction in each radiation element by the predetermined structure 100 thereof. As such, a radiation intensity and a gain of the antenna at the corresponding radiation surface can be enhanced, and performance of the antenna can be improved.

In the top view shown in FIG. 1, along an extension direction of the first connector 112, the first radiation element 111 and the second radiation element 121 are alternately distributed to form a coaxial radiation element string. For example, the radiation elements are coaxial in the extension direction of the first connector 112. Through the coupling between the first radiator 11 and the second radiator 12 and the adjustment of the current flow direction in each radiation element by the predetermined structure 100, the current flow directions in various radiation elements of the radiation element string are the same. In the scenario that a signal feeding terminal is located at the left end of the antenna shown in FIG. 1, the current flow direction in each radiation element of the antenna shown in FIG. 1 is from left to right, such that an overall current of the coaxial radiation element string flows from the left end to the right end of the antenna shown in FIG. 1. Thus, the radiation intensity and gain of the antenna at the corresponding surface are enhanced, and the performance of the antenna is improved.

A horizontal arrow in an upper portion of FIG. 1 is used to indicate the current flow direction. The current flow direction only represents an overall flow direction of the current, and does not represent an actual flow path of the current. Based on the predetermined structure 100, the current flow direction can be from the left end to the right end of the antenna. However, the actual flow path of the current may not be the straight horizontal direction indicated by the arrow.

A radiation surface is the surface perpendicular to the extension direction of the first connector. The antenna described in the embodiments of the present disclosure enhances the radiation intensity and gain to improve the performance of the antenna.

In some embodiments, the predetermined structures 100 of the at least two first radiation elements 111 and the at least one second radiation element 121 have a same structure, such that the first radiator 11 and the second radiator 12 can couple with each other more effectively, and the current flow direction in each radiation element can be adjusted desirably through the predetermined structure 100.

In some embodiments, the first radiator 11 includes two identical first radiation elements 111. The second radiator 12 includes the second radiation element 121 that is arranged in the area of the second surface S1 corresponding to the gap between the two first radiation elements 111. The second radiation element 121 includes a first end and a second end opposite to each other in the extension direction of the first connector 112. The first end is connected to the second connector 122. The second connector 122 passes through the first radiation element 111 adjacent to the first end along the extension direction of the first connector 112. One end of the second connector 122 facing away from the second radiation element 121 is the signal feeding terminal 13. As shown in FIG. 1, the left end of the second radiation element 121 is the first end, and the right end is the second end. The first end of the second radiation element 121 is connected to the second connector 122. The second connector 122 passes from right to left through the first radiation element 111 on the left. The left end of the second connector 122 is the signal feeding terminal 13, and the right end is connected to the first end of the second radiation element 121.

As shown in FIGS. 1-4, the first radiator 11 and the second radiator 12 of different layers are disconnected. In this case, the identical current flow direction in the radiation elements refers to that the current in each radiation element flows in a same first direction parallel to the extension direction of the first connector 112. If the signal feeding terminal 13 is at the left end of the antenna, the first direction is the direction from left to right in FIG. 1.

In some embodiments, the antenna enhances the radiation intensity and gain in the corresponding radiation surface. Same radiation performance may be achieved with a smaller size. Thus, the number of radiation elements arranged in the extension direction of the first connector 112 can be reduced. The coaxial radiation element string including two first radiation elements 111 and one second radiation element 122 satisfies the radiation requirement. When sufficient space is available to accommodate the antenna, the performance of the antenna may be further improved by increasing the number of radiation elements in the extension direction of the first connector 112.

In some embodiments, the antenna may include any number of alternately distributed first radiation elements and second radiation elements arranged in the extension direction of the first connector 112, which is not limited by the present disclosure.

In some embodiments, the antenna includes n second radiation elements 121. n is a positive integer greater than 1. Any two adjacent second radiation elements 121 are connected through a corresponding intermediate connector. The intermediate connector and the first connector are arranged in a straight line for a coaxial design. Assuming that the n second radiation elements 121 sequentially arranged in the extension direction of the first connector 112 are $1^{st}$ second radiation element, $2^{nd}$ second radiation element, . . . , and nth second radiation element. The end of the $1^{st}$ second radiation element facing away from the $2^{nd}$ second radiation element is connected to the second connector 122, and the end of the second connector 122 facing away from the Pt second radiation element is the signal feeding terminal 13.

The end of the second connector 122 facing away from the connected second radiation unit 121 is flush with the corresponding end of the first radiation element 111 on a same side, or extends beyond the corresponding end of the first radiation unit 111 on the same side. As shown in FIG. 1, the signal feeding terminal 13 is flush with the left end of the first radiation element 111 located on the left side, or extends beyond the left end of the first radiation element 111 located on the left side.

Arranging the signal feeding terminal 31 at one end of the antenna not only facilitates achieving the goal of controlling the current flows in the various radiation elements of the antenna through the adjustment of the predetermined structures 100 and the coupling between the first radiator 11 and the second radiator 12, but also facilitates the telescopic movement of the antenna in the housing, as described in the embodiments below.

In the antenna, each radiation element is symmetrical with respect to the first connector 112, and in a same radiation unit element, the predetermined structure 100 is symmetrical with respect to the first connector 112. As such, a predetermined structure 100 is able to effectively adjust the current flow direction of the current in the radiation element to which the predetermined structure 100 belongs. Thus, the radiation intensity and gain of the antenna at the corresponding radiation surface are enhanced, and the performance of the antenna is improved.

As shown in FIGS. 1-4, in a same radiation element, the predetermined structure 100 includes a plurality of strip-shaped slits arranged sequentially in the extension direction of the first connector 112. The plurality of strip-shaped slits extend in a direction perpendicular to the extension direction of the first connector 112. For example, as shown in FIGS. 1-4, the extension direction of the first connector 112 is a horizontal direction. For a same first radiation element 111 or a same second radiation element 121, the plurality of strip-shaped slits of the predetermined structure 100 extend in a direction perpendicular to the extension direction of the first connector 112.

In some embodiments, as shown in FIGS. 1-4, each of the first radiation element(s) 111 and the second radiation element(s) 121 includes: a plurality of strip-shaped sub-radiators sequentially arranged in the extension direction of the first connector 112. Two adjacent strip-shaped sub-radiators form a strip-shaped slit. For a same radiation element, the plurality of strip-shaped slits are disposed in a diamond-shaped area.

Figure 5:
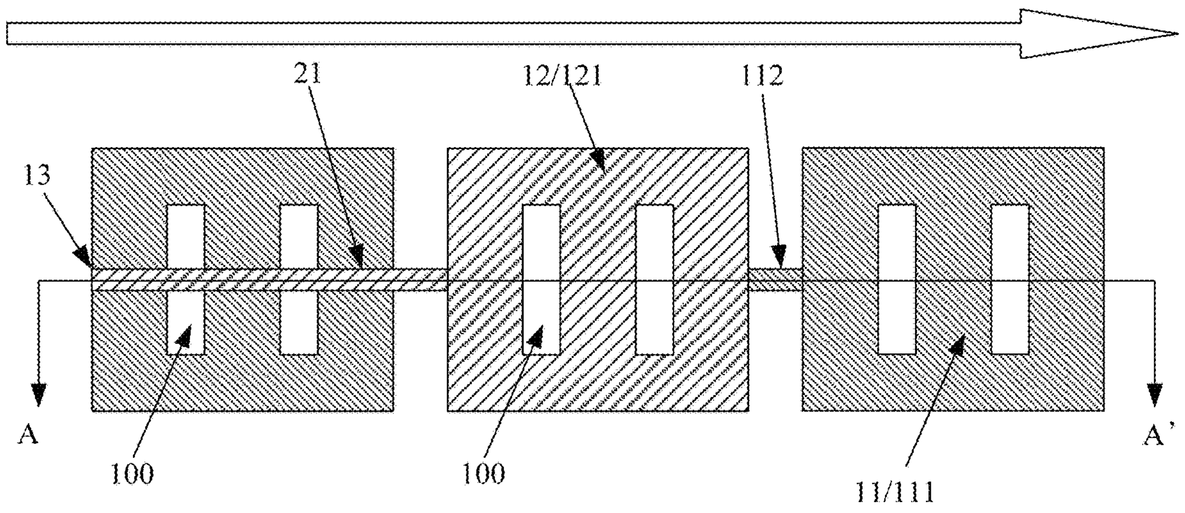
FIG. 5 is a top view of an antenna in another exemplary antenna assembly according to some embodiments of the present disclosure.
Figure 6:
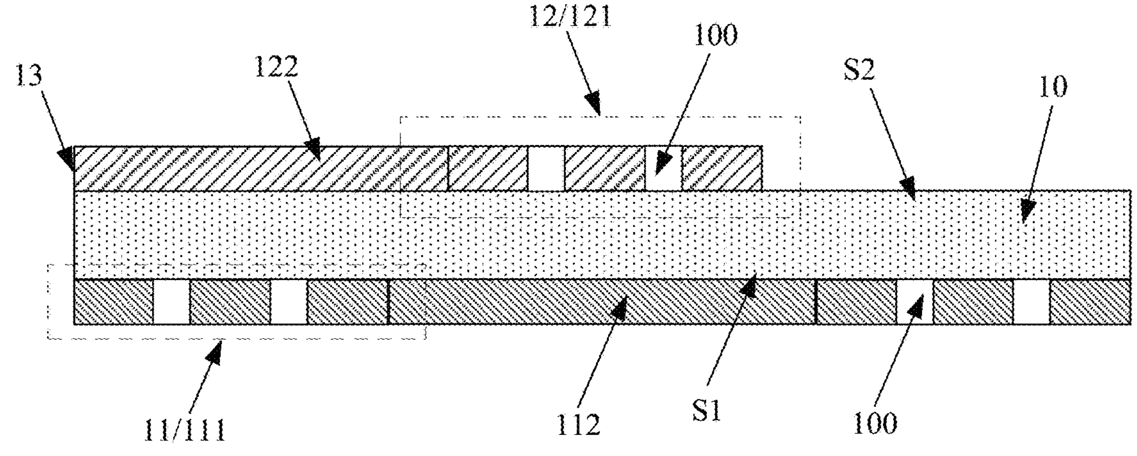
FIG. 6 is a cross-sectional view of the antenna along an A-A' direction shown in FIG. 5.
Figure 7:
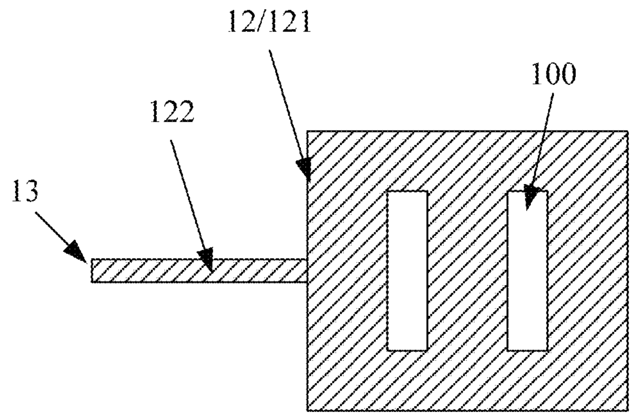
FIG. 7 is a top view of an antenna radiator of the antenna shown in FIG. 5.
Figure 8:
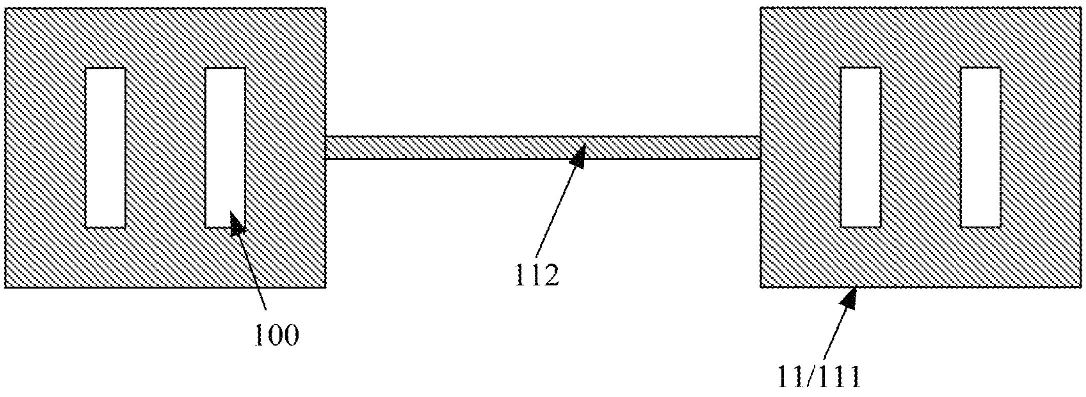
FIG. 8 is a top view of another antenna radiator of the antenna shown in FIG. 5.

FIG. 5 is a top view of an antenna in another exemplary antenna assembly according to some embodiments of the present disclosure. FIG. 6 is a cross-sectional view of the antenna along an A-A' direction shown in FIG. 5. FIG. 7 is a top view of an antenna radiator of the antenna shown in FIG. 5. FIG. 8 is a top view of another antenna radiator of the antenna shown in FIG. 5.

As shown in FIGS. 5-8, each of the first radiation element (s) 111 and the second radiation element(s) 121 is an integral radiation block including a plurality of strip-shaped hollow areas. The plurality of strip-shaped hollow areas are disposed inside the integral radiation block to extend a length of a current flow path. Extending the length of the current flow path in the integral radiation block without changing the current direction, an enhanced radiation performance can be realized using smaller radiation element(s). An extension direction of the plurality of strip-shaped hollow areas is perpendicular to the extension direction of the first connector 112, thereby substantially extending the length of the current flow path. In some embodiments, the predetermined structure 100 in a same integral radiation block is symmetrical with respect to an axis of the first connector 112.

In some embodiments, as shown in FIGS. 5-8, each of the first radiation element(s) 111 and the second radiation element(s) 121 includes a rectangular radiation block. The plurality of strip-shaped hollow areas are evenly distributed in a same rectangular radiation block, and are each symmetrical with respect to the first connector 112. In some embodiments, a shape, a size, and a layout position of the plurality of strip-shaped hollow areas on each radiator may be adjusted to extend the length of the current flow path in a single radiation element, thereby facilitating miniaturization of the antenna.

In the example shown in FIGS. 5-8, the predetermined structure 100 also provides a function of extending the length of the current flow path, such that the size of the antenna can be substantially reduced. The small size design improves the radiation performance and gain of the antenna. In some embodiments, the length of the antenna may be reduced to be within 40 mm, and the width of the antenna may be reduced to be within 15 mm. For example, the antenna may have a length of 38 mm and a width of 12 mm, or have a length of 31 mm and a width of 10 mm. Compared with the existing antennas operating in the same frequency band, the size of the antenna is substantially reduced.

The antenna provided by the embodiments of the present disclosure has the advantages of ultra-wide band and miniaturization. A relative bandwidth of the antenna with the structure shown in FIGS. 1-4 reaches 27%, which covers most of the frequency bands of Wifi 5G (5150-5850 MHz)

and Wifi 6E (5925-7125 MHz). The relative bandwidth of the antenna with the structure shown in FIGS. 5-8 reaches 14.5%, which covers the frequency bands of Wifi 5G (5150-5850 MHz). Moreover, the antenna has stable radiation characteristics within the bandwidth and has desired omnidirectionality. The gain of the antenna is significantly improved compared with conventional monopole antennas.

In the embodiments of the present disclosure, ordinary antenna materials are used to fabricate the antenna with a specific structure to obtain high-performance metamaterial antenna characteristics. Compared with conventional dipole antennas, the disclosed antenna has a wide bandwidth, a high gain, and omnidirectionality within the wide bandwidth.

The performance of the antenna provided by the embodiments of the present disclosure will be further described below in combination with various simulation data.

Figure 9:
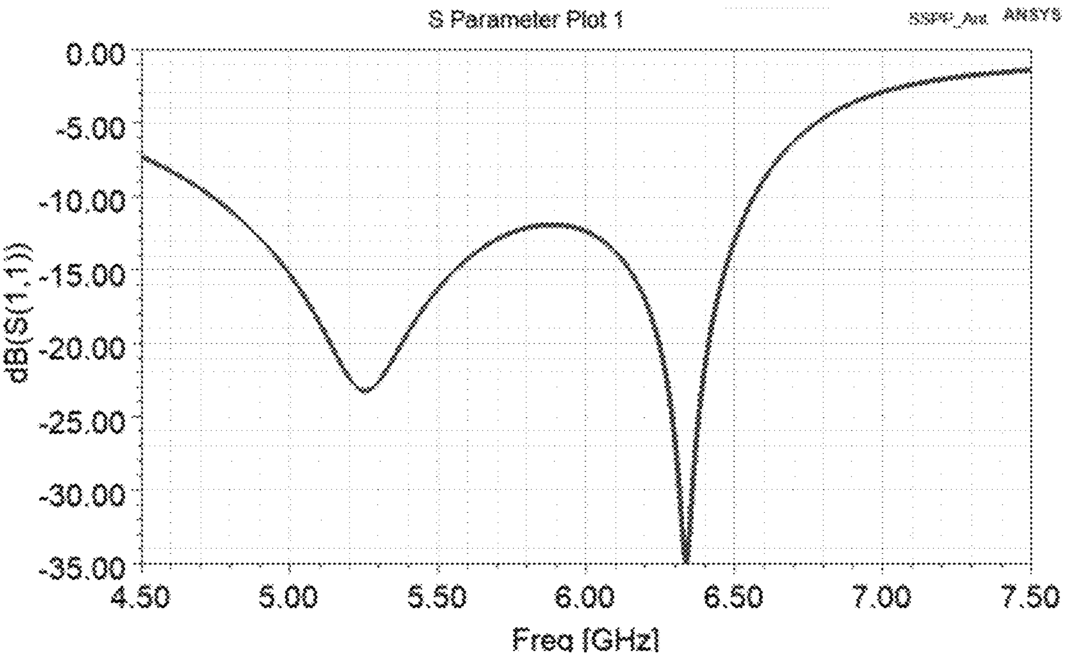
FIG. 9 shows a reflection coefficient curve of the antenna shown in FIGS. 1-4.

FIG. 9 shows a reflection coefficient curve of the antenna shown in FIGS. 1-4. As shown in FIG. 9, the antenna structure shown in FIGS. 1-4 has good reflection coefficient characteristics.

Figure 10:
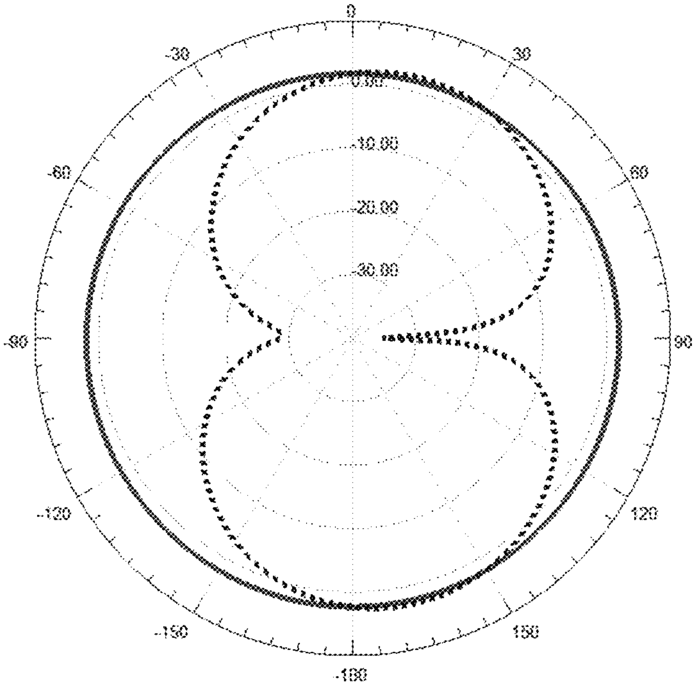
FIG. 10 shows a two-dimensional (2D) radiation pattern at 5.5 GHz of the antenna shown in FIGS. 1-4.

FIG. 10 shows a two-dimensional (2D) radiation pattern at 5.5 GHz of the antenna shown in FIGS. 1-4. As shown in FIG. 10, the antenna structure shown in FIGS. 1-4 has good 2D radiation performance at 5.5 GHz.

Figure 11:
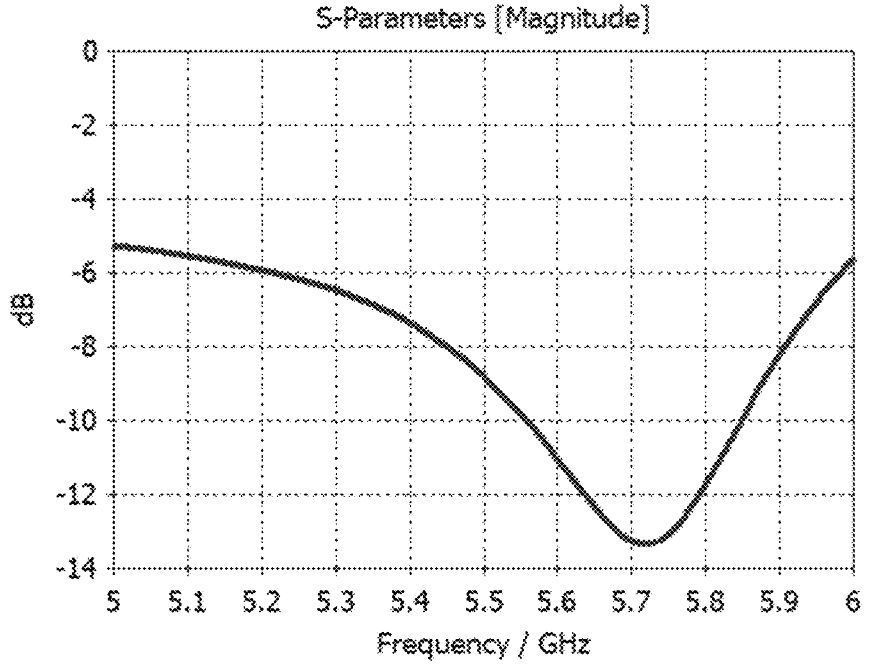
FIG. 11 shows a reflection coefficient curve of the antenna shown in FIGS. 5-8.

FIG. 11 shows a reflection coefficient curve of the antenna shown in FIGS. 5-8. As shown in FIG. 11, the antenna structure shown in FIGS. 5-8 has good reflection coefficient characteristics.

Figure 12:
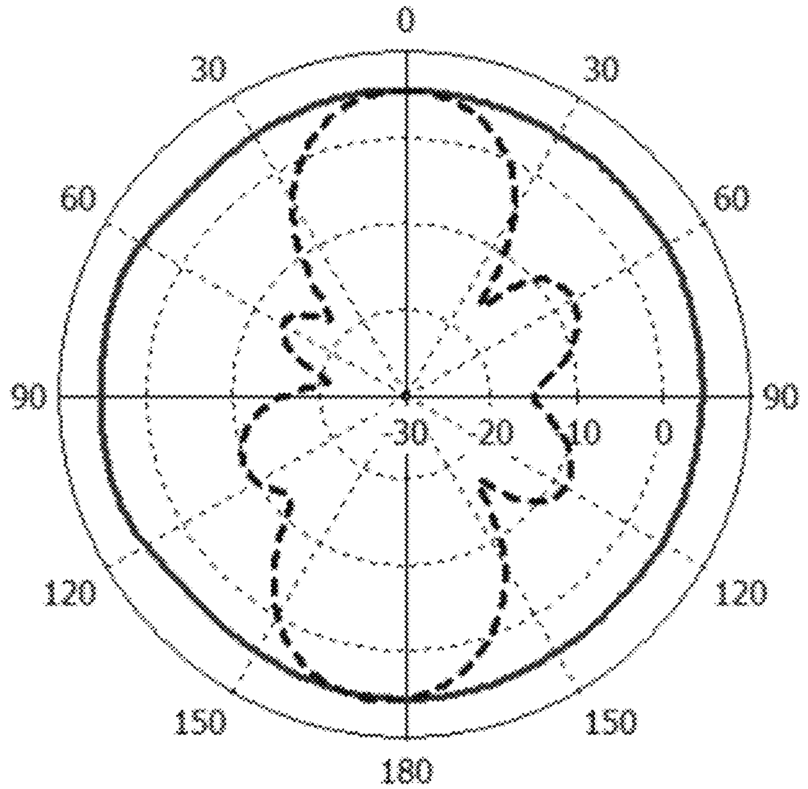
FIG. 12 shows a 2D radiation pattern at 5.5 GHz of the antenna shown in FIGS. 5-8.

FIG. 12 shows a 2D radiation pattern at 5.5 GHz of the antenna shown in FIGS. 5-8. As shown in FIG. 10, the antenna structure shown in FIGS. 5-8 has good 2D radiation performance at 5.5 GHz.

Figure 13:
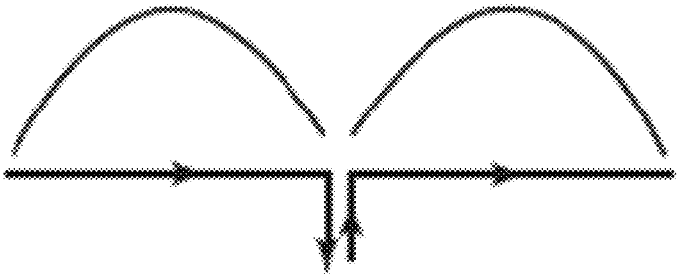
FIG. 13 is a pattern diagram of current distribution of two adjacent radiation elements of the antenna shown in FIGS. 1-4.

FIG. 13 is a pattern diagram of current distribution of two adjacent radiation elements of the antenna shown in FIGS. 1-4. As shown in FIGS. 1-4, the antenna has a structure including two complementary layers of radiators. Combining the two complementary layers of radiators and the predetermined structure 100 enables the various radiation elements in the entire coaxial radiation element string to keep a same current flow direction, thereby enhancing the radiation performance and gain on an H plane (a plane perpendicular to the current flow direction) in the pattern diagram. Any two adjacent first radiation elements 111 are connected by the first connector 112. When multiple first radiators 112 are present, extension lines of the multiple first connectors 112 are located on a same straight line, thereby achieving the coaxial design. A sum L of lengths of all radiation elements in the antenna (including gaps between adjacent radiation elements) is approximately equal to a wavelength λ, for a corresponding communication band.

Figure 14:
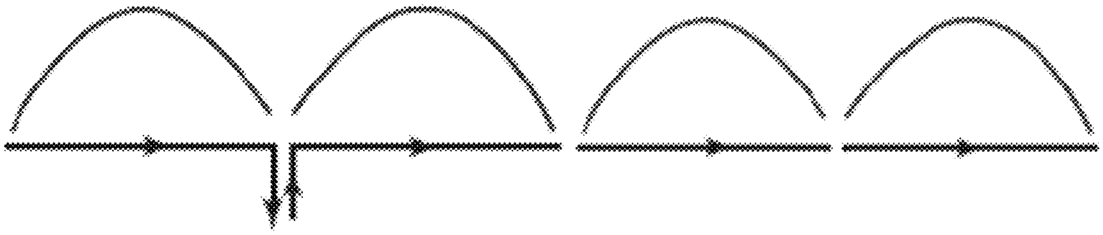
FIG. 14 is a pattern diagram of current distribution of each radiation element of the antenna according to some embodiments of the present disclosure.

FIG. 14 is a pattern diagram of current distribution of each radiation element of the antenna according to some embodiments of the present disclosure. As shown in FIGS. 1-4, after more radiation elements are added to the antenna structure, for example, reaching four radiation elements, the radiation elements in the entire coaxial radiation element string still maintain the same current flow direction.

Figure 15:
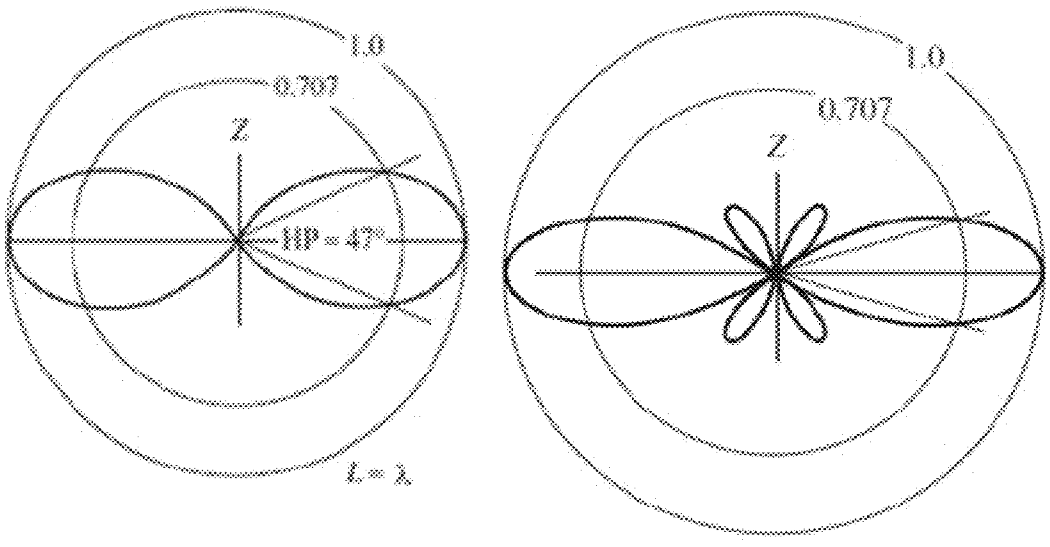
FIG. 15 is a directional diagram of the antenna according to some embodiments of the present disclosure.

FIG. 15 shows directional diagrams of the antenna according to some embodiments of the present disclosure. The diagram on the left side of FIG. 15 is a 2D radiation pattern diagram of an antenna including three radiation elements, and the diagram on the right side of FIG. 15 is a radiation pattern diagram of an antenna including four radiation elements. As shown in FIG. 15, the greater the number of the radiation elements arranged in the extension direction of the first connector 112, the sharper the directional diagram of the antenna, and the higher the gain of the antenna.

The antennas having the structures shown in FIGS. 1-4 and FIGS. 5-8 both have desired omnidirectionality, and may be used as an external antenna or an internal antenna of an electronic device.

When the antenna is used as the internal antenna, the antenna may be directly integrated into the electronic device. When the antenna is used as the external antenna, the antenna may be used in conjunction with the electronic device as shown in FIGS. 16-18.

Figure 16:
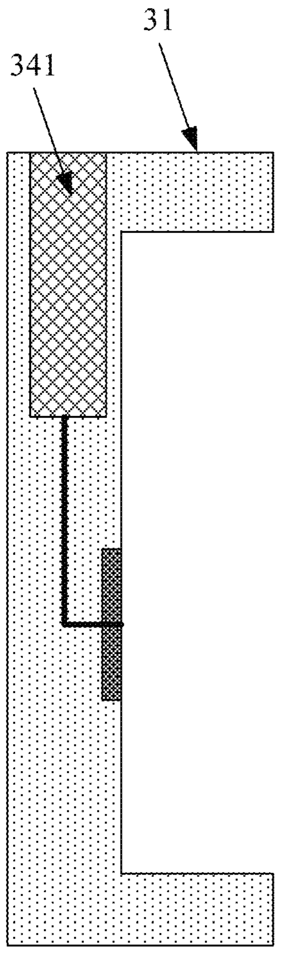
FIG. 16 is a schematic structural diagram of an exemplary antenna assembly according to some embodiments of the present disclosure.
Figure 17:
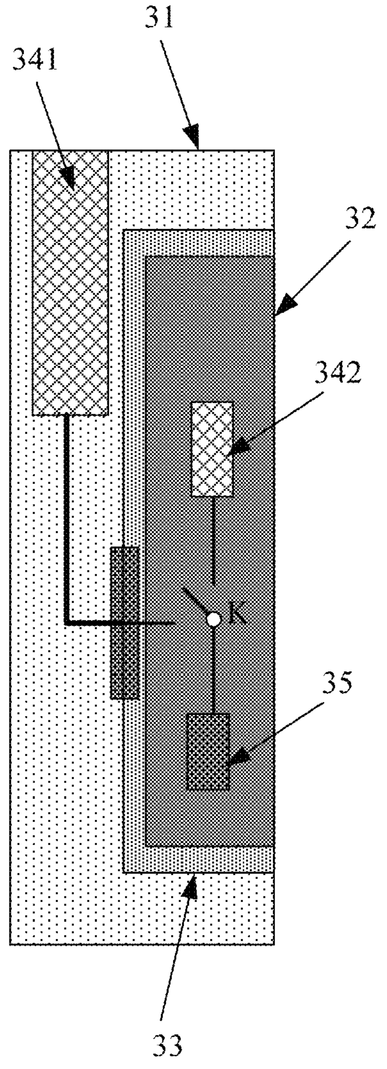
FIG. 17 is a schematic diagram showing operation principle of the antenna assembly shown in FIG. 16.

FIG. 16 is a schematic structural diagram of an exemplary antenna assembly according to some embodiments of the present disclosure. FIG. 17 is a schematic diagram showing operation principle of the antenna assembly shown in FIG. 16. As shown in FIG. 16, the antenna assembly includes an enclosure 31. The enclosure 31 is detachably fixed to a back cover 33 of an electronic device 32. An antenna 341 is disposed inside the enclosure 31. When the enclosure 31 is fixed to the back cover 33 of the electronic device 32, the antenna 341 may be electrically connected to an antenna chip 35 of the electronic device 32.

As shown in FIG. 16, the antenna assembly may be used as the external antenna of the electronic device to help enhance wireless networking capability of the electronic device.

Figure 18:
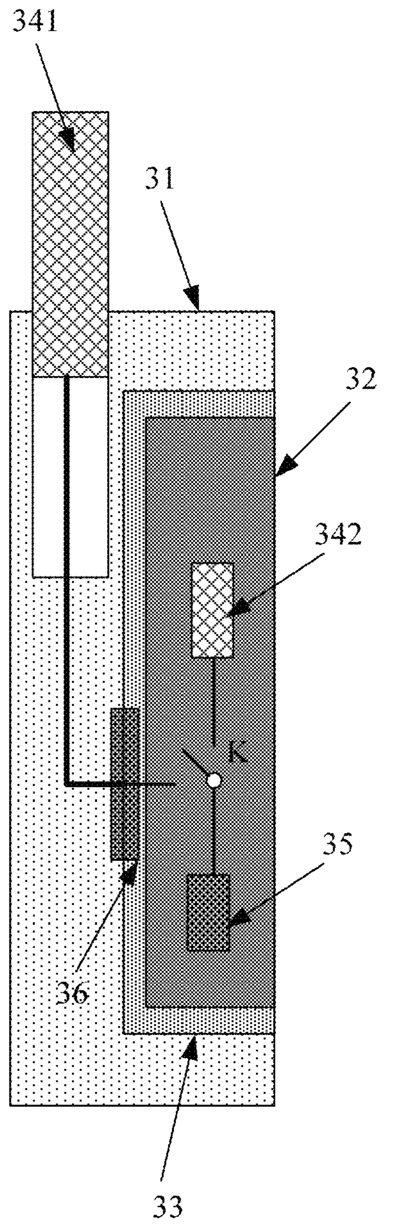
FIG. 18 is a schematic diagram showing operation principle of another exemplary antenna assembly according to some embodiments of the present disclosure.

FIG. 18 is a schematic diagram showing operation principle of another exemplary antenna assembly according to some embodiments of the present disclosure. As shown in FIG. 18, the antenna 341 is configured to be telescopically disposed in the enclosure 31. When the antenna 341 is electrically connected to the antenna chip 35 of the electronic device 32, the antenna 341 is controlled to at least partially extend to the outside of the enclosure 31 to enhance the radiation performance. When the antenna 341 is disconnected from the antenna chip 35 of the electronic device 32, the antenna 341 is retracted back into the enclosure 31.

In some embodiments, the antenna 341 is a first antenna, and a second antenna 342 is disposed at the back cover 33 of the electronic device 32. The second antenna 342 may be same as or different from the first antenna 341. A control switch K may be provided at the back cover 33 of the electronic device 32 for controlling a state of the connection between the antenna chip 35 and the second antenna 342. When the first antenna 341 is electrically connected to the antenna chip 35 of the electronic device 32, the control switch K controls the antenna chip 35 to be disconnected from the second antenna 342. When the first antenna 341 is electrically disconnected from the antenna chip 35 of the electronic device 32, the control switch K controls the antenna chip 35 to be connected to the second antenna 342.

In some embodiments, both the first antenna 341 and the second antenna 342 are Wifi antennas. The state of the connection between the antenna chip 35 and the second antenna 342 is controlled by the control switch K.

In some embodiments, the electronic device is a tablet computer. When the antenna assembly is installed on the back cover of the tablet computer, the antenna chip 35 and the second antenna 342 are disconnected. The external first antenna 341 is used for communication in the Wifi frequency band. The external first antenna 341 has a higher gain than the internal second antenna 342 by about 3 dBi.

In some embodiments, the electronic device 32 may determine whether the electronic device 32 needs to be connected to the first antenna 341 based on sensing data of its internal gyroscope or other sensing data. The electronic device 32 may automatically control the control switch K based on the sensing data. For example, the electronic device 32 may control the control switch K to connect to the second antenna 342 or a peripheral contact terminal 36 on the back cover 33. The peripheral contact terminal 36 is used to connect to the first antenna 341.

In some embodiments, the electronic device 32 includes a detection circuit therein for detecting whether the peripheral contact terminal 36 is disconnected from the first antenna 341. If it is detected that the peripheral contact terminal 36 is disconnected from the first antenna 341, the electronic device 32 controls the control switch K to connect the antenna chip 35 to the second antenna 342. After the peripheral contact terminal 36 is disconnected from the first antenna 341, the electronic device 32 may also display a prompt message to inform a user to store the first antenna 341 back into the enclosure 31. In some other embodiments, the antenna assembly may include a trigger control device. After the peripheral contact terminal 36 and the first antenna 341 are disconnected, the trigger control device of the antenna assembly automatically retracts the first antenna 341 back into the enclosure 31.

The present disclosure also provides an electronic device. The electronic device may be the electronic device as shown in FIG. 17 or FIG. 18. The electronic device 32 includes: a back cover 33, a second antenna 342, and an antenna chip 35, that are disposed inside the back cover 33. The disclosed antenna assembly may be detachably fixed to the outside of the back cover 33. When the disclosed antenna assembly is detachably fixed to the outside of the back cover 33, the electronic device 32 may control either the first antenna 341 or the second antenna 342 to connect to the antenna chip 35.

In some embodiments, the disclosed antenna assembly is detachably fixed to the outside of the back cover 33. To ensure a reliable connection between the first antenna 341 and the peripheral contact terminal 36 of the electronic device 32, a magnetic component may be provided on one of the electronic device 32 and the antenna assembly to magnetically attach to another magnetic component or a metal piece provided on the other of the electronic device 32 and the antenna assembly. Thus, the reliability of the electrical connection between the antenna assembly and the electronic device 32 may be improved, and at the same time the stability of the attachment may be improved.

For the coupling of the electronic device and the antenna assembly, references can be made to the description of the previous embodiments, and detailed description thereof will not be repeated herein.

The electronic device may connect to Wifi networks through the internal second antenna 342 or the external first antenna 341 as needed, thereby providing desired user experience.

Embodiments in this specification are described in a progressive manner, and each embodiment focuses on the differences from other embodiments. For the same or similar parts in various embodiments, reference can be made to each other. The features described in various embodiments in this specification may be replaced or combined with each other, such that those skilled in the art can implement or use the present disclosure. As for the device-type embodiments, because they are basically similar to the method embodiments, the description thereof is relatively simple. For details of related parts, reference can be made to the description of other embodiments.

In the description of the present disclosure, the descriptions of the drawings and embodiments are illustrative rather than restrictive. Like reference numerals in the drawings identify like structures throughout the embodiments of the specification. In addition, the drawings may exaggerate the thickness of some layers, films, panels, regions, etc. for the sake of comprehension and ease of description. Also, when an element such as a layer, a film, a region, or a substrate is referred to as being "on" another element, it can be directly on the other element or indirectly through an intermediate element. In addition, "on" means positioning an element on or under another element, but does not mean positioning on an upper side of another element according to the direction of gravity.

The orientation or positional relationships indicated by terms "upper," "lower," "top," "bottom," "inner," "outer," etc. are based on the orientation or positional relationship shown in the drawings, and are only for the convenience of describing the present disclosure and simplifying the descriptions, rather than indicating or implying that the device or element referred to must have a specific orientation, be constructed and operate in a specific orientation, and thus should not be construed as limiting the present disclosure. When a component is said to be "connected" to another component, it may be directly connected to the other component or there may be an intermediate component at the same time.

In the specification, relational terms such as "first" and "second", etc. are only used to distinguish one entity or operation from another entity or operation, and do not necessarily require or imply that any such actual relationship or order exists between these entities or operations. Moreover, the term "comprises", "includes" or any other variation thereof is intended to cover a non-exclusive inclusion such that an article or device comprising a set of elements includes not only those elements but also other elements not expressly listed, or elements inherent in the article or device. Without further limitations, an element defined by the phrase "comprising a . . . " does not exclude the presence of additional identical elements in the article or device comprising the aforementioned element.

The above description of the disclosed embodiments is provided to enable any person skilled in the art to make or use the present application. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be accorded the broadest scope consistent with the principles and novel features disclosed herein.

What is claimed is:

1. An antenna assembly comprising an antenna, the antenna including:

a substrate including a first surface and a second surface arranged opposite to each other;

a first radiator disposed at the first surface and including two first radiation elements spaced apart from each other and connected to each other by a connector; and a second radiator disposed at the second surface and including a second radiation element disposed at an area of the second surface corresponding to an area of the first surface between the two first radiation elements;

wherein each of the two first radiation elements and the second radiation element includes a current adjustment structure configured to adjust a current flow direction in the radiation element to which the current adjustment structure belongs; and wherein:

the current adjustment structure in each of the two first radiation elements and the second radiation element includes a plurality of strip-shaped slits arranged sequentially in an extension direction of the connector and extending in a direction perpendicular to the extension direction of the connector; or each of the two first radiation elements and the second radiation element includes a plurality of strip-shaped hollow areas extending in the direction perpendicular to the extension direction of the connector.

2. The antenna assembly according to claim 1, wherein:

the two first radiation elements and the second radiation element have a same structure; and the current adjustment structures in all the radiation elements have a same structure.

3. The antenna assembly according to claim 1, wherein:

the connector is a first connector;

the two first radiation elements are same as each other;

the second radiation element includes a first end and a second end opposite to each other in the extension direction of the first connector;

the first end is connected to a second connector that passes through one of the two first radiation elements that is adjacent to the first end in the extension direction of the first connector; and an end of the second connector facing away from the second radiation element is a signal feeding terminal.

4. The antenna assembly according to claim 1, wherein each of the two first radiation elements and the second radiation element includes a plurality of strip-shaped sub-radiators in a diamond-shaped area and sequentially arranged in the extension direction of the connector, two adjacent ones of the strip-shaped sub-radiators forming one of the strip-shaped slits.

5. The antenna assembly according to claim 1, wherein each of the two first radiation elements and the second radiation element includes an integral radiation block including the plurality of strip-shaped hollow areas.

6. The antenna assembly according to claim 5, wherein:

the integral radiation block includes a rectangular radiation block; and the plurality of strip-shaped hollow areas in a same radiation element are evenly distributed, and are each symmetrical with respect to the connector.

7. The antenna assembly according to claim 1, further comprising:

an enclosure configured to be detachably fixed to a back cover of an electronic device;

wherein the antenna is disposed inside the enclosure and is configured to be electrically connected to an antenna chip of the electronic device when the enclosure is fixed to the back cover of the electronic device.

8. The antenna assembly according to claim 7, wherein the antenna is telescopically disposed inside the enclosure.

9. An electronic device comprising:

a back cover, having an external side configured to be detachably fixed to an antenna assembly including a first antenna;

a second antenna disposed inside the back cover; and an antenna chip, configured to be connected to the first antenna or the second antenna;

wherein the first antenna includes:

a substrate including a first surface and a second surface arranged opposite to each other;

a first radiator disposed at the first surface and including two first radiation elements spaced apart from each other and connected to each other by a connector; and a second radiator disposed at the second surface and including a second radiation element disposed at an area of the second surface corresponding to an area of the first surface between the two first radiation elements;

wherein each of the two first radiation elements and the second radiation element includes a current adjustment structure configured to adjust a current flow direction in the radiation element to which the current adjustment structure belongs; and wherein:

the current adjustment structure in each of the two first radiation elements and the second radiation element includes a plurality of strip-shaped slits arranged sequentially in an extension direction of the connector and extending in a direction perpendicular to the extension direction of the connector; or each of the two first radiation elements and the second radiation element includes a plurality of strip-shaped hollow areas extending in the direction perpendicular to the extension direction of the connector.

10. The electronic device according to claim 9, wherein:

the two first radiation elements and the second radiation element have a same structure; and the current adjustment structures in all the radiation elements have a same structure.

11. The electronic device according to claim 9, wherein:

the connector is a first connector;

the two first radiation elements are same as each other;

the second radiation element includes a first end and a second end opposite to each other in the extension direction of the first connector;

the first end is connected to a second connector that passes through one of the two first radiation elements that is adjacent to the first end in the extension direction of the first connector; and an end of the second connector facing away from the second radiation element is a signal feeding terminal.

12. The electronic device according to claim 9, wherein each of the two first radiation elements and the second radiation element includes a plurality of strip-shaped sub-radiators in a diamond-shaped area and sequentially arranged in the extension direction of the connector, two adjacent ones of the strip-shaped sub-radiators forming one of the strip-shaped slits.

13. The electronic device according to claim 9, wherein each of the two first radiation elements and the second radiation element includes an integral radiation block including the plurality of strip-shaped hollow areas.

14. The electronic device according to claim 13, wherein:

the integral radiation block includes a rectangular radiation block; and the plurality of strip-shaped hollow areas in a same radiation element are evenly distributed, and are each symmetrical with respect to the connector.

15. The electronic device according to claim 9, wherein the antenna assembly further comprises:

an enclosure configured to be detachably fixed to the back cover;

wherein the first antenna is disposed inside the enclosure and is configured to be electrically connected to the antenna chip of the electronic device when the enclosure is fixed to the back cover of the electronic device.

16. The electronic device according to claim 15, wherein the first antenna is telescopically disposed inside the enclosure.

* * * * *